United States Patent
Prakah-Asante et al.

(10) Patent No.: US 7,253,724 B2
(45) Date of Patent: Aug. 7, 2007

(54) VEHICLE PRE-IMPACT SENSING AND CONTROL SYSTEM WITH DRIVER RESPONSE FEEDBACK

(75) Inventors: Kwaku O. Prakah-Asante, Commerce Township, MI (US); Manoharprasad K. Rao, Novi, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 186 days.

(21) Appl. No.: 10/982,131

(22) Filed: Nov. 5, 2004

(65) Prior Publication Data

US 2006/0109094 A1    May 25, 2006

(51) Int. Cl.
*B60Q 1/00* (2006.01)
(52) U.S. Cl. .............. 340/439; 340/479; 340/576
(58) Field of Classification Search ........... 340/439, 340/436, 479, 435, 903, 575, 576, 432, 427, 340/467
See application file for complete search history.

(56) References Cited

U.S. PATENT DOCUMENTS

| | | | | |
|---|---|---|---|---|
| 5,465,079 | A * | 11/1995 | Bouchard et al. | 340/576 |
| 6,317,666 | B1 * | 11/2001 | List et al. | 701/29 |
| 6,643,578 | B2 * | 11/2003 | Levine | 701/70 |
| 6,734,799 | B2 * | 5/2004 | Munch | 340/576 |
| 6,925,425 | B2 * | 8/2005 | Remboski et al. | 702/188 |
| 7,012,513 | B2 * | 3/2006 | Frank et al. | 340/439 |
| 2001/0003436 | A1 * | 6/2001 | Yoshikawa | 340/439 |
| 2002/0107629 | A1 * | 8/2002 | Maruko et al. | 701/93 |

* cited by examiner

*Primary Examiner*—Brent A. Swarthout
(74) *Attorney, Agent, or Firm*—Frank MacKenzie

(57) ABSTRACT

A vehicle pre-impact sensing and control system generates tailored adaptive warning signals as a function of driver vehicle use. The tailored signals are used in a vehicle controller for determining appropriate driver warning or safety device activations.

10 Claims, 3 Drawing Sheets

VEHICLE PRE-IMPACT SENSING AND CONTROL SYSTEM WITH DRIVER RESPONSE FEEDBACK

TECHNICAL FIELD

The present invention relates generally to collision warning and brake-assist systems, and, more particularly, to a method and apparatus for pre-impact sensing and control with driver response feedback for improved safety.

BACKGROUND OF THE INVENTION

Collision warning systems are becoming more widely used. In general, collision warning systems provide a vehicle operator with knowledge and awareness of objects or vehicles within close proximity so as to prevent a collision with those objects. Current collision warning systems are unitary in nature in that they only warn the operator of the vehicle containing the collision warning system of a potential collision. A sensor located on a vehicle, upon sensing an object generates an object detection signal, which is communicated to the operator of that vehicle.

Vehicle restraint and brake systems are designed to assist in mitigating the effects of a potential collision. A typical driver requires about one second to recognize a potential collision and responsively activate brakes. Often, however, when drivers activate brakes during imminent crash conditions a full amount of braking pressure is not always applied. Early activation and full application of brakes are therefore key requirements for collision avoidance or closing velocity reduction.

Pre-impact warning and brake assist systems (e.g. panic brake systems) have been introduced in the automotive industry for improved safety. Existing panic brake systems are activated when the action of the driver on the brake-pedal is considered a panic-braking situation.

Vehicle controller decisions to fully activate brake systems are generated as a function of driver initial application of the brakes. However, different drivers have different braking characteristics and nuisance panic braking activation can occur. A method to rapidly activate and tailor warning and brake-assist systems to the driver may therefore reduce nuisance panic braking.

Therefore, it would be desirable to provide an advanced pre-impact driver response feedback system to improve reaction time and decrease the probability of a collision occurring while reducing nuisance panic braking.

SUMMARY OF THE INVENTION

In one aspect of the invention, a vehicle pre-impact sensing and control system generates tailored adaptive warning signals as a function of driver vehicle use. The tailored signals are used in a vehicle controller for determining appropriate driver warning or safety device activations.

In a further aspect of the invention, a method for operating a vehicle pre-impact sensing and control system includes tracking vehicle operation characteristics of a driver; tuning at least one of driver warning intensity or driver warning time as a function of the vehicle operation characteristics; warning the driver of potential collisions as a function of the tuning; and monitoring, as a function of brake operation, driver response characteristics to the warning.

Accordingly, an advantage of the present invention is that warning intensity and warning time are tuned as a function of driver characteristics and requirements. An inexperienced driver or older driver could select earlier warning signals than an experienced driver. Driver feedback information in conjunction with the warning level indication provides added reliability for brake-assists activation.

Another advantage is that incorporation of adaptive collision warning systems in the pre-impact sensing and control system reduces the potential for false alarms. Slow brake activation or low brake application by the driver is not only compensated but also tailored to the type of driver. Consequently, the multi-variable discrete time strategy facilitates effective multi-input decision-making for tailored activation. Critical lead-time of, for example, 300 ms is given to the driver to help avoid a collision and reduce impact velocity.

A further advantage is that the method capitalizes on sensor systems to promote multi-functional use to reduce costs.

Other advantages and features of the present invention will become apparent when viewed in light of the detailed description of the preferred embodiment when taken in conjunction with the attached drawings and appended claims.

DETAILED DESCRIPTION

Figure 1:
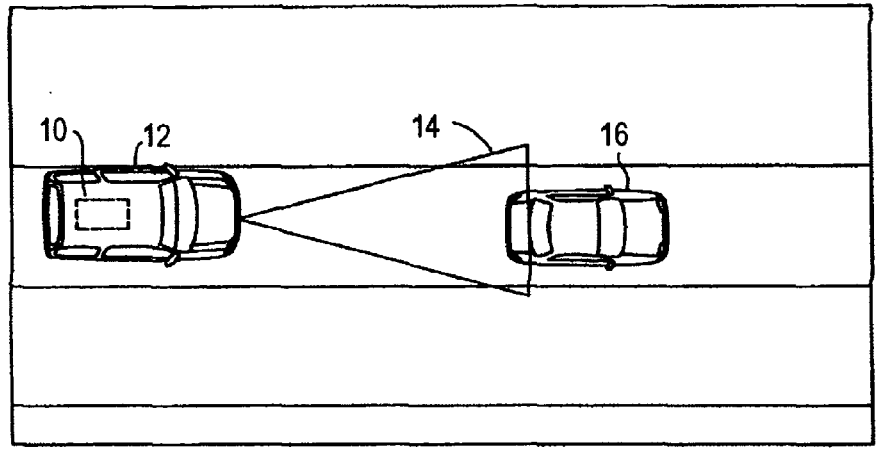
FIG. 1 is an aerial view of a host vehicle in operation in accordance with one embodiment of the present invention.

In the following figures the same reference numerals will be used to illustrate the same components. While the present invention is described with respect to a particular method and apparatus for occupant safety, various adaptations will be evident to those skilled in the art.

The present invention is a pre-impact sensing and control system 10 incorporating driver response feedback, for generating tailored adaptive warning signals, and brake assist, for improving vehicle safety.

Referring to FIG. 1, an aerial view of the vehicle sensing and control system 10 in a vehicle 12 is illustrated. The vehicle 12 includes sensors having a field-of-view 14 such that a target vehicle 16 may be detected. The host vehicle sensor field-of-view 14 is configured to allow detection of various potential crash scenarios for the host vehicle 12. The field-of-view 14 covers, for example, 90-degree frontal, offset, and oblique type crashes.

Figure 2:
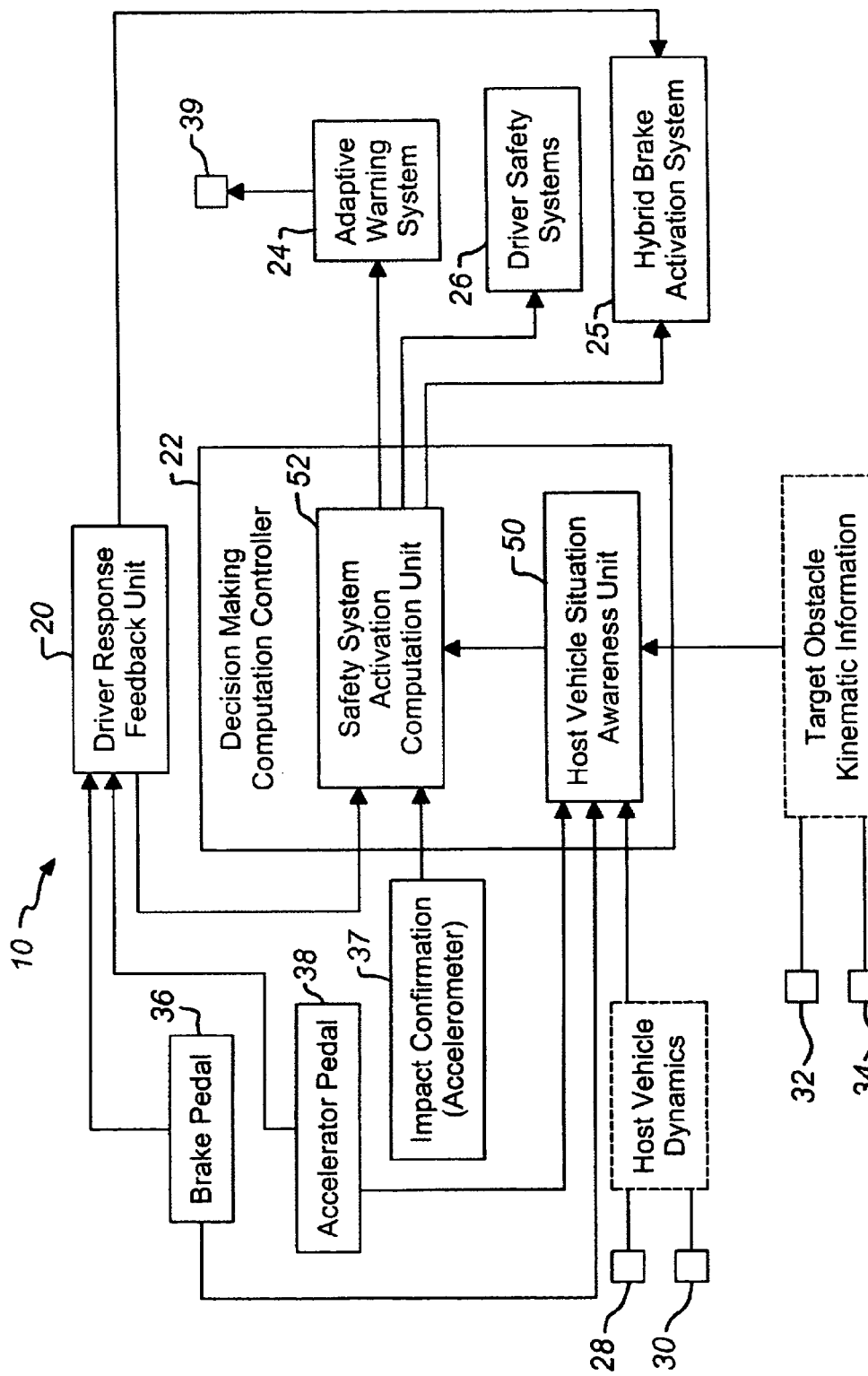
FIG. 2 is a system diagram of the host vehicle control system of FIG. 1.

Referring to FIG. 2, a block diagram of the control system 10 of FIG. 1 is illustrated. The system 10 includes, for example, a driver feedback unit 20, an adaptive warning system 24, occupant safety systems 26, a hybrid brake activation system 25, host vehicle dynamic sensors or control devices 28 and 30, a brake pedal position sensor 36, an accelerator pedal position sensor 38, an impact confirmation (accelerometer 37), and a decision-making computation controller 22, which interacts with all of the aforementioned devices and includes a host vehicle situation awareness unit 50 and a safety system activation computation unit 52.

The decision-making computation controller 22 includes logic generating potential collision warning signals for the driver as a function of a driver response signal from the driver response feedback unit 20, host vehicle kinematics from dynamics sensors 28, 30, and target object kinematics from the remote sensors 32, 34.

The controller logic further monitors, as a function of brake and accelerator pedal operation, driver response characteristics to the warning signals. Still further, the controller activates vehicle safety systems 25 and 26 as a function of the driver response characteristics.

Vision, radar, or lidar sensors 32, 34 obtain remote information about potential obstacles in the path of the host vehicle 12 before collision. The controller host vehicle situation awareness unit 50 utilizes remote sensors 32, and 34 for monitoring the range and range-rate and therefrom predicting the potential for collision. Obstacles not in the host vehicle path are filtered as a function of vehicle yaw-rate information from vehicle sensors and control systems 28, 30 (e.g. an inertial measurement unit). The kinematics information obtained therefrom is then received in the multi-variable countermeasure activation system or safety system activation computation unit 52 for activating, for example, the adaptive driver warning system 24, occupant safety systems 26, and the hybrid braking system 25.

Driver warnings and brake assists are tuned within the computation unit 52 as a function of driver characteristics from the driver response feedback unit 20. Final activation of the braking systems 25 is based on a minimum brake-pressure threshold value. Driving behavior is tracked in the driver response feedback unit 20, which sets minimum accelerator pedal release-rate and brake pedal position before activation. The system 10 provides decision-making in a sequential fashion for collision warning in the adaptive warning system 24, panic brake-assist in the hybrid brake activation system 25, and occupant safety systems 26.

The driver, before impact, is advised of potential collisions through the adaptive warning system 24, while driver response characteristics are simultaneously monitored for control manipulation of the brake booster solenoid through operation of the brake pedal. The adaptive warning system 24 may generate warning levels at different times depending on driver characteristics. In other words, warning intensity and warning time are tuned as a function of driver characteristics; and the adaptive warning system 24 generates signals according to this tuning. This tuning may assist drivers because the earlier the driver is alerted of the potential for impact the more time the driver will have to respond.

The driver notification is particularly important for reducing occurrences wherein drivers do no apply the brakes before collision.

After determining that a crash is imminent, the decision-making controller 22 systematically decides what safety devices to activate and recommends deployment before and during the collision. The safety system activation computation unit 52 assists in decisions for multistage restraints activation.

In one embodiment of the present invention, an inexperienced driver or an older driver may have earlier warning signals than an experienced driver. These warnings may be turned on, off, or adjusted with a switch 39 or through the controller 22. In other words, a less experienced driver may set the switch to one skill level or driver characteristic including substantial crash potential warning, whereas a more experienced driver may turn off pre-impact warnings altogether.

Figure 3:
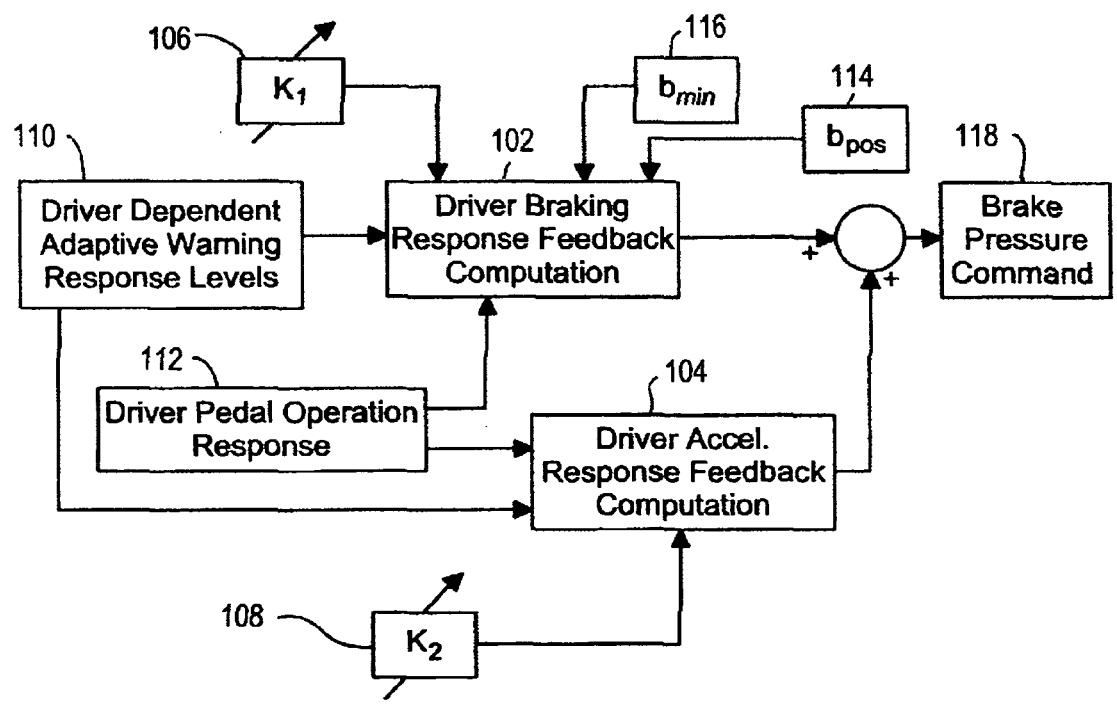
FIG. 3 is a system diagram of the driver feedback response unit of FIG. 2 in accordance with another embodiment of the present invention.

Referring to FIGS. 1, 2, and 3, the driver feedback unit 20 is illustrated having logic for brake pressure command computations generated as a function of driver response feedback and adaptive warning levels. The driver feedback unit receives signals from the brake pedal position sensor 36 and the acceleration pedal position sensor 38 and stores and processes this information over time. For example, a more aggressive driver may accelerate very quickly and apply the vehicle brakes more strongly than a more cautious driver. The driver response feedback unit 20 may set a threshold for various types of drivers. These thresholds may define different driver classifications and different associated and adaptive driver warning or safety system activations.

The driver feedback computations are conducted in operation blocks 102 and 104 for driver braking and driver acceleration respectively. Both operation blocks 102, 104 receive respective tuning gains, $K_1$, from input block 106, and $K_2$, from input block 108. Further, both operation blocks 102, 104 receive driver dependent adaptive warning response levels from operation block 110.

These warnings include the preset thresholds discussed above and are associated with various vehicle warning systems. Both operation blocks 102, 104 also receive present driver pedal operation response from input block 112 indicating the present positions of the acceleration pedal. The driver braking response feedback compensation block 102 also receives current brake position and minimum brake pedal travel from input blocks 114 and 116 respectively.

In operation block 118 a brake pressure command is generated as a function of operation blocks 102 and 104.

One embodiment of equations governing the adaptive warning system of the driver response feedback unit 20 includes:

$$W_1 = \left(\frac{R_{rel}}{V_{rel}}\right) \quad (1)$$

where $W_1$ the warning level, $R_{rel}$ the range, and $V_{rel}$ the relative velocity.

The ratios between the adaptive warning levels are given by:

$$\frac{\gamma_2}{\gamma_1} = \alpha_1 \quad (2)$$

$$\frac{\gamma_3}{\gamma_1} = \alpha_2 \quad (3)$$

where $\gamma_1, \gamma_2, \gamma_3$ are the adaptive warning level thresholds based on the warning zones provided for a driver in operation block 110 and $\alpha_1, \alpha_2$ are tunable ratio-gains.

The adaptive warning level, AW_level is determined by:

$$AW\_level = \begin{cases} Z_1 & \text{if } (\gamma_2 \leq W_l < \gamma_1) \\ Z_2 & \text{if } (\gamma_3 \leq W_l < \gamma_2) \\ Z_3 & \text{if } (W_l < \gamma_3) \\ Z_0 & \text{no-warning otherwise} \end{cases} \quad (4)$$

where $Z_3$ is level 3, the highest warning intensity; $Z_2$ is level 2 warning intensity level; $Z_1$ is level 1 warning intensity; and $Z_0$ is the "no warning" level.

The output brake pressure ($b_p$) is generated as a function of:

$$b_p = \text{sat}(D\_input + C\_input) \quad (5)$$

where D_input and C_input are the driver and controller brake input contributions respectively, and sat is a saturation function.

The controller brake input contribution, C_input is determined through:

$$C\_input(n) = \quad (6)$$
$$\begin{cases} K_1 Aw\_level(n)(b_{pos}(n) - b_{min}(n)) + K_2 Aw\_level(n)\left(\frac{a_{pos}(n-1) - a_{pos}(n-2)}{T_{samp}}\right) \\ \text{if } b_{pos} \geq b_{min} \end{cases}$$

where $a_{pos}$ is the accelerator pedal position, $K_1$ and $K_2$ are tuning gains, whereas $b_{pos}$ and $b_{min}$ are the brake position and minimum brake pedal travel respectively; and T_samp is the accelerator release rate sample time, thereby generating a multi-variable discrete time strategy.

Final activation of the braking system in response to a brake pressure command from operation block 118 is generated as a function of minimum brake-pressure determined values. Driver feedback information and the warning level indication provide robustness to the functionality of the brake-assists system 25. The collision warning levels therefore reduce the potential for false alarms.

When a fast accelerator release rate is obtained and the computed warning level is high, an immediate response of the braking system 25 is generated with minimum brake pedal movement.

Rapid brake activation is helpful to drivers for avoiding collisions or maximizing velocity reduction before impact for improved injury mitigation. However, when a driver quickly releases the accelerator pedal but no impeding danger is observed from the warning system, the panic-brake assist system or pre-impact warning system 10 is not activated. Alternately, slow brake activation or low brake application by the driver is compensated for, and full braking engaged during impending danger situations.

In an alternate embodiment of the present invention, an accelerometer 37 is included to confirm impact. When, for example, the host vehicle 12 collides with an object, the safety system activation computation unit 52 may confirm a collision from vehicle deceleration signals obtained from the accelerometer.

The present invention provides a new adaptive collision warning and predictive panic brake-assist system. The method and system utilize driver feedback information of accelerator release-rate, brake pedal position, and a generated warning signal of the potential for impact, for control. The multi-variable discrete time strategy discussed above incorporates anticipatory sensor and vehicle dynamics data, for active adaptation of the brake systems 25 and occupant restraints 26. Brake activation zones are set for brake pedal position and accelerator pedal release rate and generated as a function of learned driver characteristics. Further, the driver is advised of potential collisions through the adaptive warning scheme, while driver response characteristics are simultaneously monitored for hierarchical control manipulation of the brake booster solenoid.

The adaptive warning scheme in the driver response feedback unit 20 and decision-making controller 22 allows warning levels at different times depending on driver characteristics. The decision-making algorithm in the controller 22 utilizes information from remote sensors mounted in front of the vehicle, which may also be used by the lead vehicle for other convenience and safety applications such as stop-and-go adaptive cruise control and pedestrian detection.

Figure 4:
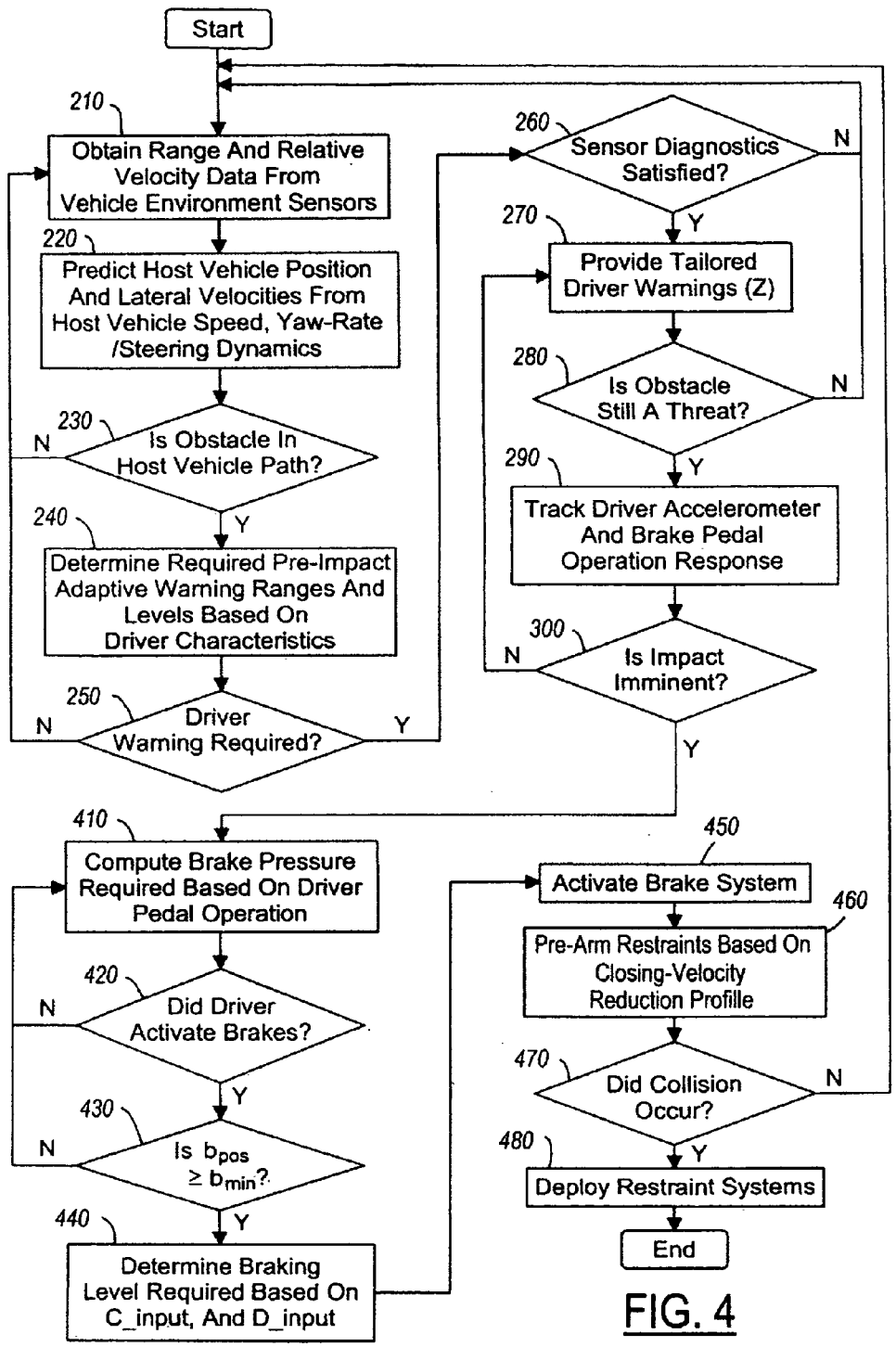
FIG. 4 is a flow chart of the operation of the system of FIG. 2 in accordance with another embodiment of the present invention.

Referring to FIG. 4, a logic flow diagram of a method for operating a vehicle pre-impact sensing and control system, in accordance with an embodiment of the present invention, is illustrated. Logic starts in operation block 210 where range and relative velocity data from vehicle environment sensors, such as remote sensors 32 and 34 and host vehicle sensors 28 and 30 are obtained.

In operation block 220 host vehicle position and lateral velocities are predicted from host vehicle speed, yaw rate, and steering dynamics in, for example, the vehicle situation awareness unit 50.

In inquiry block 230 a check is made whether an obstacle is in the host vehicle path. For a negative response, operation block 210 reactivates.

Otherwise, in operation block 240, a determination is made of the required pre-impact adaptive warning ranges and levels based on driver characteristics. This computation is generally conducted in the safety system activation computation unit 52 as a function of signals from the driver response feedback unit 20.

In inquiry block 250 a check is made whether a driver warning is required. For a negative response, operation block 210 reactivates.

Otherwise, in inquiry block 260, a check is made whether sensor diagnostics are satisfied. For a negative response, operation block 210 reactivates.

Otherwise, in operation block 270, tailored driver warnings are generated for the driver in the adaptive warning system 24.

In inquiry block 280 a check is made whether the obstacle is still a threat. For a negative response, operation block 210 reactivates. Otherwise, in operation block 290, driver accelerometer and brake pedal operation response is tracked in the host vehicle situation awareness unit 50.

In inquiry block 300 a check is made in the host vehicle situation awareness unit 50 whether impact is imminent. For a negative response, operation block 270 reactivates.

Otherwise, in operation block 410, brake pressure required as a function of driver pedal operation is computed in the safety system activation computation unit 52 as a function of the driver response feedback unit signals.

In inquiry block 420 a check is made as to whether the driver actually did activate the brakes. For a negative response, operation block 410 is reactivated.

Otherwise, in inquiry block 430, a check is made as to whether the brake position is greater than or equal to the minimum required brake position. For a negative response, operation block 410 is reactivated.

Otherwise, in operation block 440, the braking level required as a function of driver and controller brake outputs is determined.

In operation block 450 the brake system is activated as a function of signals from the hybrid brake activation system 25.

In operation block 460 restraints are pre-armed as a function of closing velocity reduction profiles.

In inquiry block 470 a check is made as to whether a collision did occur in the decision-making controller unit 22. For a negative response, operation block 210 reactivates.

Otherwise, in operation block 480, restraint systems and other occupant safety systems are deployed.

In operation, a method for operating a vehicle pre-impact sensing and control system includes tracking vehicle operation characteristics of a driver; tuning at least one of driver warning intensity or driver warning time as a function of the vehicle operation characteristics; warning the driver of potential collisions as a function of the tuning; and monitoring, as a function of brake operation, driver response characteristics to the warning.

While particular embodiments of the invention have been shown and described, numerous variations and alternate embodiments will occur to those skilled in the art. Accordingly, it is intended that the invention be limited only in terms of the appended claims.

What is claimed is:

1. A method for pre-impact sensing and control for a vehicle and vehicle driver comprising:
    tracking vehicle operation characteristics of the driver;
    tuning at least one of driver warning intensity or driver warning time as a function of said vehicle operation characteristics and a driver category;
    warning the driver of potential collisions as a function of said tuning; and
    monitoring, as a function of brake operation, driver response characteristics to said warning;
    wherein said step of tuning further comprises tuning said warning intensity or said driver warning time for an aggressive driver, a passive driver, an elderly driver, an average drive, or an inexperienced driver;
    wherein said step of tuning further comprises determining which driver category the driver belongs as a function of at least one of consistent hard-braking or consistent aggressive accelerator operation.

2. The method of claim 1 further comprising activating occupant safety systems as a function of said driver response characteristics to said warning.

3. The method of claim 1 further comprising activating or assisting driver braking in response to driver response characteristics.

4. The method of claim 1, wherein warning the driver of potential collisions as a function of said tuning further comprises sensing a target object in an operational path of the vehicle.

5. The method of claim 4, wherein warning the driver of potential collisions as a function of said tuning further comprises determining kinematics of the vehicle.

6. The method of claim 5, wherein warning the driver of potential collisions as a function of said tuning further comprises predicting future positions of the vehicle and said target object.

7. A safety system for a host vehicle and a driver comprising:
    at least one of an acceleration pedal or a brake pedal generating control device signals as a function of host vehicle operation;
    at least one remote sensor coupled to the host vehicle and sensing an object in a direction of travel of the host vehicle and generating a sensor signal in response thereto;
    a driver response feedback unit comprising predetermined adaptive warning level, said feedback unit further comprising logic tracking driver behavior over time as a function of said control device signals, said feedback unit comparing said driver behavior over time with said predetermined adaptive warning levels and generating a driver response signal as a function of said comparison; and
    a decision-making computation controller comprising logic generating potential collision warning signal for the driver as a function of said driver response signal and host vehicle and target object kinematics, said logic further monitoring, as a function of brake operation, driver response characteristics to said warning signals, said controller activating vehicle safety systems as a function of said driver response characteristics and activating or assisting driver braking as a function of a driver accelerator release rate; and
    wherein said controller logic comparing said driver behavior over time with said predetermined adaptive warning levels further comprises determining an aggressive driver, a passive drive, an elderly driver, an average driver, or an inexperienced driver;
    wherein said controller logic comparing said driver behavior over time with said predetermined adaptive warning levels further comprises determining which driver category the driver belongs as a function of at least one of consistent hard-braking, consistent soft-braking, consistent aggressive accelerator operation, consistent moderate accelerator operation, or consistent passive accelerator operation.

8. The system of claim 7, wherein said controller activates or assists driver braking as a function of brake position, adaptive warning levels, and tunable gains.

9. The system of claim 7, wherein said controller further determines whether a safety countermeasure is required and which countermeasure may be required.

10. The system of claim 7 further comprising a control switch, operable by the driver, setting vehicle response as a function of driver characteristics.

* * * * *